(12) United States Patent
Bierbaum et al.

(10) Patent No.: US 8,566,168 B1
(45) Date of Patent: Oct. 22, 2013

(54) ELECTRONIC PAYMENT USING A PROXY ACCOUNT NUMBER STORED IN A SECURE ELEMENT

(75) Inventors: Christopher J. Bierbaum, Overland Park, KS (US); Warren B. Cope, Olathe, KS (US); Robin D. Katzer, Olathe, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/344,096

(22) Filed: Jan. 5, 2012

(51) Int. Cl.
G06Q 20/00 (2012.01)
G06Q 30/00 (2012.01)
H04B 1/38 (2006.01)

(52) U.S. Cl.
USPC ............... 705/17; 705/16; 705/26.1; 455/558

(58) Field of Classification Search
None
See application file for complete search history.

(56) References Cited

U.S. PATENT DOCUMENTS

| | | | |
|---|---|---|---|
| 6,314,409 B2 | 11/2001 | Schneck et al. | |
| 6,490,601 B1 | 12/2002 | Markus et al. | |
| 6,732,919 B2 | 5/2004 | Macklin et al. | |
| 6,886,741 B1 | 5/2005 | Salveson | |
| 7,413,113 B1 | 8/2008 | Zhu | |
| 7,494,058 B2 * | 2/2009 | Bonalle et al. | 235/380 |
| 7,546,266 B2 | 6/2009 | Beirne et al. | |
| 7,575,177 B2 * | 8/2009 | Killian et al. | 235/492 |
| 7,644,859 B1 | 1/2010 | Zhu | |
| 7,926,714 B1 | 4/2011 | Zhu | |
| 7,988,060 B2 * | 8/2011 | Killian et al. | 235/492 |
| 7,996,324 B2 * | 8/2011 | Bishop et al. | 705/64 |
| 8,123,128 B1 | 2/2012 | Zhu | |
| 8,401,904 B1 * | 3/2013 | Simakov et al. | 705/16 |
| 2003/0126094 A1 * | 7/2003 | Fisher et al. | 705/75 |
| 2004/0010462 A1 * | 1/2004 | Moon et al. | 705/39 |
| 2004/0218741 A1 | 11/2004 | Welton | |
| 2004/0260647 A1 | 12/2004 | Blinn et al. | |
| 2006/0237528 A1 * | 10/2006 | Bishop et al. | 235/380 |
| 2007/0055785 A1 | 3/2007 | Stevens | |
| 2009/0182634 A1 | 7/2009 | Park et al. | |
| 2011/0237296 A1 * | 9/2011 | Coppinger | 455/558 |
| 2012/0108296 A1 * | 5/2012 | Coppinger | 455/558 |
| 2012/0203701 A1 * | 8/2012 | Ayuso de Paul | 705/71 |

OTHER PUBLICATIONS

Office Action dated Oct. 12, 2006; U.S. Appl. No. 10/901,630, filed Jul. 28, 2004.

Office Action dated Apr. 5, 2007; U.S. Appl. No. 10/901,630, filed Jul. 28, 2004.

(Continued)

*Primary Examiner* — Asfand Sheikh

(57) ABSTRACT

A near field communication payment method using a proxy account number. The method comprises transmitting a proxy account number from a secure element of a mobile phone to a point-of-sale terminal using a near field communication radio link; transmitting the proxy account number from the point-of-sale terminal to a payment mediation server; transmitting the proxy account number from the payment mediation server to a proxy account manager; determining a selected payment account number by the proxy account manager based in part on retrieving a plurality of payment account numbers from a proxy account number data store using the proxy account number; transmitting the selected payment account number to the payment mediation server by the proxy account manager; and the payment mediation server completing a payment completion transaction with the point-of-sale terminal using the selected payment account number.

13 Claims, 8 Drawing Sheets

(56) References Cited

OTHER PUBLICATIONS

Office Action dated Oct. 9, 2007; U.S. Appl. No. 10/901,630, filed Jul. 28, 2004.
Notice of Allowance dated Apr. 8, 2008; U.S. Appl. No. 10/901,630, filed Jul. 28, 2004.
Office Action dated Apr. 16, 2009; U.S. Appl. No. 12/172,813, filed Jul. 14, 2008.
Notice of Allowance dated Sep. 9, 2009; U.S. Appl. No. 12/172,813, filed Jul. 14, 2008.
Office Action dated Aug. 20, 2010; U.S. Appl. No. 12/631,372, filed Dec. 4, 2009.
Notice of Allowance dated Dec. 14, 2010; U.S. Appl. No. 12/631,372, filed Dec. 4, 2009.
Office Action dated Jul. 7, 2011; U.S. Appl. No. 13/045,306, filed Mar. 10, 2010.
Notice of Allowance dated Oct. 27, 2011; U.S. Appl. No. 13/045,306, filed Mar. 10, 2010.
Office Action dated Mar. 5, 2012; U.S. Appl. No. 13/250,611, filed Sep. 30, 2011.
Final Office Action dated Oct. 5, 2012, U.S. Appl. No. 13/250,611, filed Sep. 30, 2011.
Advisory Action dated Dec. 19, 2012, U.S. Appl. No. 13/250,611, filed Sep. 30, 2011.
Cope, Warren B., et al., "Method of Transaction Processing to Support Proxy Financial Card", filed Sep. 30, 2011, U.S. Appl. No. 13/250,611.
Cope, Warren B., et al., "Electronic Purchase Transaction Trust Infrastructure", filed May 29, 2012, U.S. Appl. No. 13/482,731.
Notice of Allowance dated Jun. 21, 2013, U.S. Appl. No. 13/250,611, filed Sep. 30, 2011.
Ching, Andrew T., et al., "Payment Card Rewards Programs and Consumer Payment Choice", Journal of Banking & Finance, vol. 34, Issue 8, Aug. 2010, pp. 1773-1787, ISSN 0378-4266, http://dx.doi.org/10.1016/j.jbankfin.2010.03.015.

* cited by examiner

ELECTRONIC PAYMENT USING A PROXY ACCOUNT NUMBER STORED IN A SECURE ELEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Near field communication (NFC) refers to short-range wireless radio communication based on NFC standards. While the term 'short-range' is not precisely defined, the maximum distance for NFC radio communication is about 20 centimeters (about 8 inches) at the time of filing of this patent application. Without limitation, NFC radio communication typically occurs over distances on the order of 4 centimeters (about 1.5 inches). NFC is an open platform technology that is governed by the ECMA-340 standard and the ISO/IEC 18092 standard. It is understood that NFC standards continue to evolve as the technology and applications of the technology are elaborated and refined. NFC radio communication may be used for financial transactions such as completing a payment transaction from a mobile phone encapsulating an electronic credit card and/or debit card to a point-of-sale (POS) terminal.

A secure element (SE) may store confidential information such as financial account balances, fund balances, and/or electronic money and/or access codes such as building entry codes, hotel room entry codes, rental car activation codes. The secure element may be a specialized semiconductor device and/or semiconductor chip that is designed to thwart attempts to reverse engineer the secure element or to physically slice and examine the secure element under a microscope. In an embodiment, one or more secure elements may be provided in a separate memory chip or a plurality of separate memory chips. The secure element may allow only a limited number of applications to access the secure element and/or may limit the functions that may be initiated by those applications. In an embodiment, a near field communication transceiver may be coupled to a secure element to promote secure payment interactions between the secure element and a point-of-sale terminal.

SUMMARY

In an embodiment, a near field communication payment method using a proxy account number is disclosed. The method comprises transmitting a proxy account number from a secure element of a mobile phone to a point-of-sale terminal using a near field communication radio link; transmitting the proxy account number from the point-of-sale terminal to a payment mediation server; transmitting the proxy account number from the payment mediation server to a proxy account manager; determining a selected payment account number by the proxy account manager based in part on retrieving a plurality of payment account numbers from a proxy account number data store using the proxy account number; transmitting the selected payment account number to the payment mediation server by the proxy account manager; and the payment mediation server completing a payment completion transaction with the point-of-sale terminal using the selected payment account number.

In an embodiment, a method of provisioning a proxy account number to a secure element of a mobile phone is disclosed. The method comprises receiving by a proxy account manager a message requesting provisioning of a proxy account number for a secure element of a mobile phone, the provisioning request message identifying a first payment account number and in response to the provisioning request message identifying the first payment account number, generating by the proxy account manager a proxy account number. The method further comprises creating by the proxy account manager an association of the proxy account number with the secure element in a proxy account number data store, creating by the proxy account manager an association of the first payment account number with the proxy account number in the proxy account number data store, receiving by the proxy account manager a message requesting to provision a second payment account number to the secure element of the mobile phone, the provisioning request message identifying the second payment account number, and creating by the proxy account manager an association of the second payment account number with the proxy account number in the proxy account number data store.

In an embodiment, a method of creating and presenting an aggregated report of electronic payment transactions is disclosed. The method comprises receiving a message requesting payment information, wherein the message comprises a first proxy account number, resolving the first proxy account number to a plurality of payment account numbers associated with the first proxy account number in a proxy account number data store, and selecting one of the payment account numbers for completing a payment transaction associated with the payment information request message. The method further comprises sending a message in reply to the payment information request message containing the selected payment account number, creating a record comprising information about the payment transaction, where the record identifies both the first proxy account number and the selected payment account number, and storing the record in a transaction data store. The method further comprises accessing a plurality of records associated with a plurality of different payment account numbers stored in the transaction data store based on the first proxy account number, wherein each of the plurality of records is associated with the first proxy account number and generating an aggregated report of electronic payment transactions associated with the first proxy account number based on accessing the plurality of records.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Electronic devices may conduct electronic payment exchanges by transmitting messages wirelessly containing appropriate financial information. For example, an electronic device may communicate with a point-of-sale (POS) terminal via a near field communication (NFC) radio link and provide a credit card number and possibly other authenticating information to the point-of-sale terminal to complete a payment transaction. The credit card number and authenticating information may be stored in a secure element (SE) on the electronic device that has been provisioned under the auspices of a financial institution associated with the credit card issuer. The number of secure elements in an electronic device may be limited, however, which may constrain a user of the electronic device to using fewer electronic payment vehicles than they would prefer.

The present disclosure teaches provisioning a proxy account number into the secure element and associating a plurality of electronic payment vehicles with the single proxy account number, thereby increasing the number of electronic payment vehicles that can be associated with the electronic device. During a payment transaction, the single proxy account number is resolved to a selected one of a plurality of electronic payment vehicles associated with the proxy account number by a proxy account manager, and the account number of the selected electronic payment vehicle is provided by the proxy account manager for completing the payment transaction. This can provide useful service to users based on functionality that is transparent to point-of-sale terminals and to financial institutions. Because the functionality is transparent to them, the point-of-sale terminals and the financial institutions may not need to make changes to their systems or only trivial changes to their systems to make the disclosed system function. This means a smaller set of partners and fewer machines can be coordinated to roll out and effectuate the system taught herein than otherwise would be the case if the point-of-sale terminals needed to be updated, for example. In an embodiment, the use of proxy account numbers as taught herein promotes generating an aggregated report of transactions using a plurality of different payment vehicles.

Figure 1:
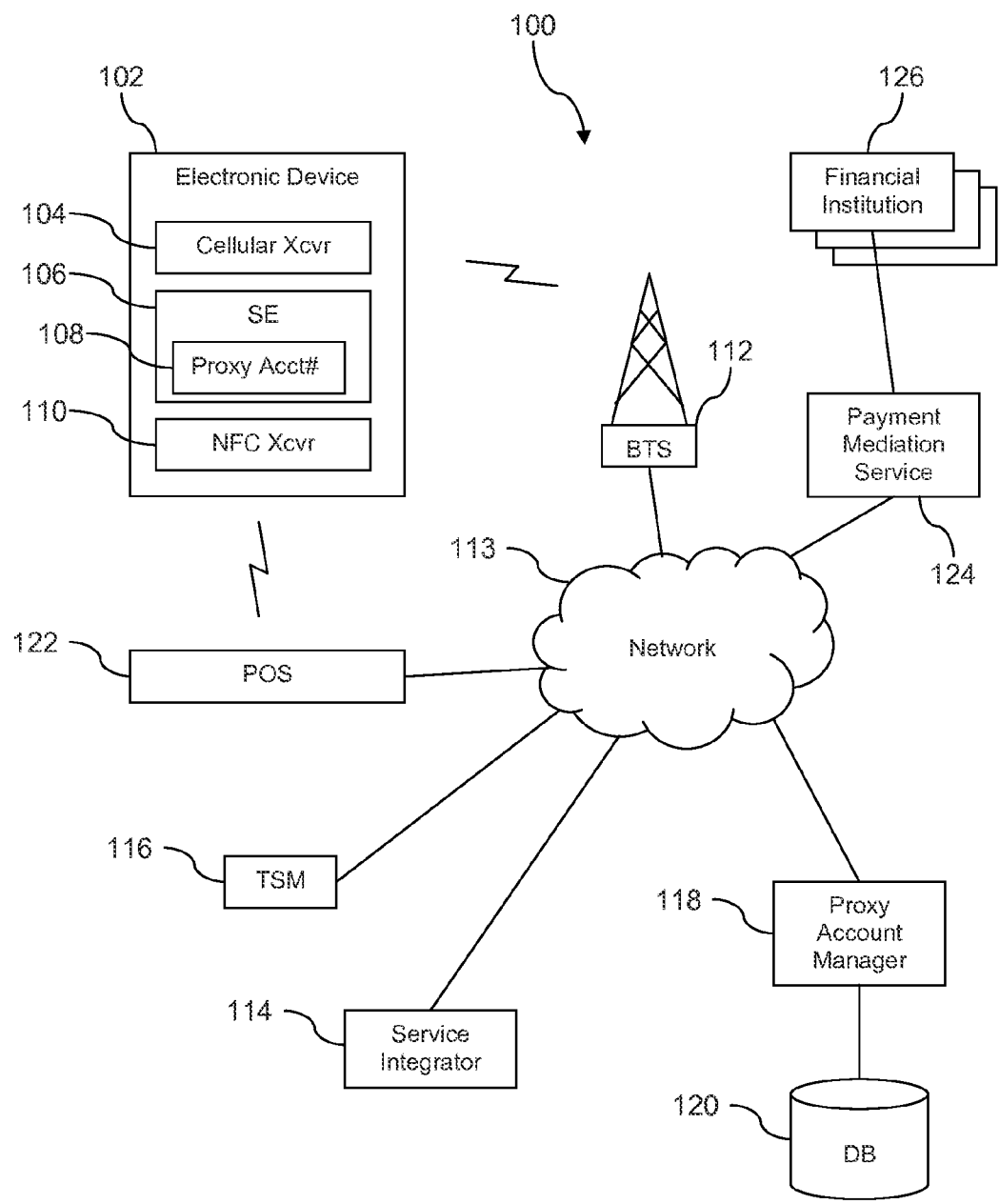
FIG. 1 is an illustration of an electronic payment system according to an embodiment of the disclosure.

Turning now to FIG. 1, an electronic payment system 100 is described. In an embodiment, the system 100 comprises an electronic device 102 that comprises a cellular radio transceiver 104, at least one secure element 106 that stores a proxy account number 108, and a near field communication (NFC) radio transceiver 110. The electronic device 102 may be a mobile phone, a personal digital assistant (PDA), a media player, or some other portable electronic device. The cellular radio transceiver 104 may establish a wireless communication link with a base transceiver station 112, and the base transceiver station 112 may provide connectivity of the electronic device 102 to the network 113. The network 113 may comprise any combination of public and private communication networks. The cellular radio transceiver 104 may wirelessly communicate with the base transceiver station 112 based on one of a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or a different wireless communication protocol.

A service integrator 114 may send a request via the network 113 to a trusted service manager (TSM) 116 to enable a payment vehicle on the secure element 106, for example a credit card. In some contexts the service integrator 114 may be referred to as a service integrator server. The trusted service manager 116 sends a request via the network 113 for a proxy account number to a proxy account manager 118. The request sent by the trusted service manager 116 may comprise information such as the account number of the payment vehicle, optional authentication information such as an authorization code, identification of the electronic device 102, and identification of the secure element 106. The proxy account manager 118 enters an association between a proxy account number and the account number of the payment vehicle in a proxy account number data store 120. The association may be created in the form of an entry or record in the proxy account number data store 120. The entry may comprise a variety of information such as the proxy account number, the account number of the payment vehicle, authentication information, an identification of the electronic device 102, the identification of the secure element 106, and possibly other information. The proxy account manager 118 sends the requested proxy account number to the trusted service manager 116.

The service integrator 114, trusted service manager 116, and the proxy account manager 118 may be implemented as computer systems. For example, in an embodiment, the service integrator 114 may be implemented by a first server computer, the trusted service manager 116 may be implemented by a second server computer, and the proxy account manager 118 may be implemented as a third server computer. One or more of the service integrator 114, the trusted service manager 116, and the proxy account manager 118 may be implemented in a cloud computing environment. Computer systems are discussed further hereinafter.

If the secure element 106 is unprovisioned, the trusted service manager 116 installs the proxy account number into the secure element 106. For example, the trusted service manager 116 may use an electronic key to unlock the secure element 106, write the proxy account number into the secure element 106, and then use an electronic key to lock the secure element 106. If the secure element 106 is already provisioned, there is no need for the trusted service manager 116 to interact with the secure element 106 to provision the subject payment vehicle. The payment vehicle may be a variety of financial payment apparatuses. The payment vehicle may be a credit card. The payment vehicle may be branded credit card, such as a gas card, a department store credit card, or other credit card restricted to use within a branded environment. The payment vehicle may be a debit card. The payment vehicle may be a cash card. The payment vehicle may be a discounting card. The payment vehicle may be a coupon. The process described above can be used to associate additional payment vehicles with the secure element 106, thereby overloading the single secure element 106 with multiple payment vehicles. The proxy account number tracked and maintained by the proxy account manager 118 and the proxy account number data store 120 enable this overloading functionality.

The electronic device 102 may be used to pay for products or services at a point-of-sale (POS) terminal 122. The point-of-sale terminal 122 may be implemented as a computer system. The user of the electronic device 102 may have selected a specific electronic wallet to be active, for example a wallet associated with personal spending. The user may have provisioned a plurality of electronic wallets on the electronic device 102 for various purposes. For example, the user may have a second electronic wallet associated with working expenses and a third electronic wallet associated with expenses related to a special interest group for which he or she is acting as current treasurer. The user of the electronic device 102 may have associated the personal spending wallet with the secure element 106. Additionally, the user of the electronic device 102 may have associated a first payment account and a second payment account with the proxy account number 108 stored in the secure element 106. The first payment account may be a credit card and the second payment account may be a gas credit card or a branded credit card.

The point-of-sale terminal 122 conducts a near field communication session with the near field communication radio transceiver 110, and the near field communication radio transceiver 110 provides the proxy account number 108 to the point-of-sale terminal 122. The point-of-sale terminal 122 may send a payment transaction request message to a payment mediation service 124 to obtain the payment authorized by the user of the electronic device 102. The payment mediation service 124 may be implemented on a computer system. In some contexts, the payment mediation service 124 may be referred to as a payment mediation server. The payment mediation service 124, based on the format and/or structure of the proxy account number 108, sends the payment transaction request message, possibly reformatted, to the proxy account manager 118. The proxy account manager 118 accesses the proxy account number data store 120 based on the proxy account number 108 to identify all payment accounts associated with the proxy account number 108.

The proxy account manager 118 then selects one of these payment accounts to be used to complete the subject payment transaction. The proxy account manager 118 may make this selection decision based on having received a message from the electronic device 102 defining which payment account number to associate to the proxy account number 108. Alternatively, the proxy account manager 118 may apply pre-defined rules to select the payment account number based on contextual information associated with the payment transaction. For example, if the point-of-sale terminal 122 is a gas pump operated by the gasoline retailer associated with the gas credit card of the second payment account, the proxy account manager 118 selects the second payment account number. The proxy account manager 118 sends a message to the payment mediation service 124 comprising the selected payment account number and optionally additional information such as an authorization code or other corroborative or security information.

The payment mediation service 124 may handshake with a financial institution 126, for example an issuer of a gas credit card, selected based on the selected payment account number. The financial institution 126 may be implemented by a computer system. The payment transaction is completed, possibly electronically transferring money to an account associated with the point-of-sale terminal 122 or queuing a payment transaction for later settlement.

A confirmation of the completion of the payment transaction may be returned to the point-of-sale terminal 122. The point-of-sale terminal 122 may notify a clerk that the payment transaction has been successfully completed or display a message to this effect for viewing by the user of the electronic device 102. The point-of-sale terminal 122 may further transmit a payment completed message via near field communication to the electronic device 102. The payment mediation service 124 may send a message to the proxy account manager 118 confirming the payment transaction including other information such as the total payment amount and an identity of the point-of-sale terminal 122. Alternatively, the proxy account manager 118 may learn this information in the initial request message including the proxy account number 108 sent to it by the payment mediation service 124. Provisioning of proxy account numbers 108, provisioning of payment account numbers to an already provisioned proxy account number, and payment using a proxy account number 108 are further discussed below with reference to message sequence diagrams.

Figure 2:
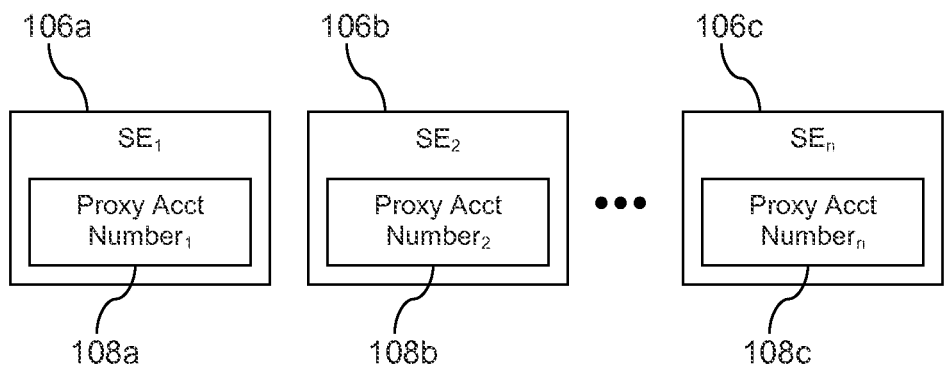
FIG. 2 illustrates storage of proxy account numbers in secure elements according to an embodiment of the disclosure.

Turning now to FIG. 2, a plurality of secure elements 106 are described. In an embodiment, a plurality of secure elements 106 may be encapsulated in the electronic device 102. For example, in an embodiment, the electronic device 102 comprises a first secure element 106a, a second secure element 106b, and a third secure element 106c. It is understood that the electronic device 102 may comprise any number of secure elements 106. Each of the secure elements 106 may be provisioned to store a payment account number—a number of a unique credit card account or other payment vehicle—or a proxy account number 108. As illustrated in FIG. 2, the first secure element 106a may be provisioned to store a first proxy account number 108a, the second secure element 106b may be provisioned to store a second proxy account number 108b, and the third secure element 106c may be provisioned to store a third proxy account number 108c. It is understood that some secure elements 106 may be provisioned with a proxy account number 108 while other secure elements 106 may be provisioned with a payment account number (that is, an actual payment account number, not a proxied account number).

Figure 3:
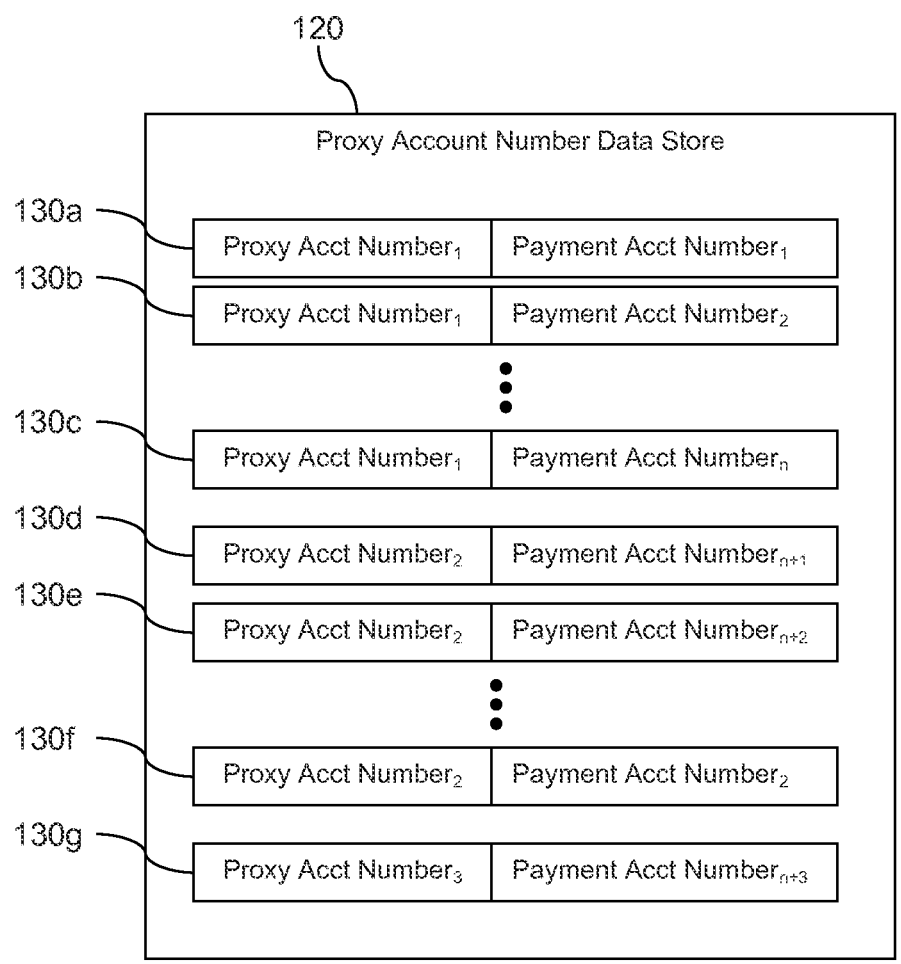
FIG. 3 illustrates data in a data store according to an embodiment of the disclosure.

Turning now to FIG. 3, the proxy account number data store 120 is described. The proxy account manager 118 may create and/or write an entry 130 into the proxy account number data store 120 that associates a proxy account number 108 with a payment account number. For example, a first entry 130a may associate the first proxy account number 108a with a first payment account number; a second entry 130b may associate the first proxy account number 108a with a second payment account number, a third entry 130c may associate the first proxy account number 108a with a third payment account number, a fourth entry 130d may associate the second proxy account number 108b with a fourth payment account number, a fifth entry 130*e* may associate the second proxy account number 108*b* with a fifth payment account number, a sixth entry 130*f* may associate the second proxy account number 108*b* with the second payment account number, and a seventh entry 130*g* may associate the third proxy account number 108*c* with a sixth payment account number. Note that the second payment account number is associated with two different proxy account numbers 108: the second payment account number is associated with the first proxy account number 108*a* by the second entry 130*b* and with the second proxy account number 108*b* by the sixth entry 130*f*.

It is understood that the entries 130 in the proxy account number data store 120 may take different forms in different embodiments. Additionally, the entries 130 may comprise additional information such as an authentication code or authorization code associated with the payment vehicle, an expiration date of the payment vehicle, an identification of the electronic device 102, an identification of the secure element 106, and other information. It is understood that the entries 130 may relate to a plurality of different electronic devices 102, for example a large number of electronic devices 102 that receive wireless communication services from the same wireless service provider. Further, the proxy account number data store 120 may comprise other entries other than the entries 130 described above. For example, the proxy account number data store 120 may store entries that contain information about financial transactions completed based on the proxy account numbers 108. Alternatively, information about financial transactions completed based on the proxy account numbers 108 may be stored in entries created by the proxy account manager 118 in a different data store (not shown) other than the proxy account number data store 120.

Figure 4:
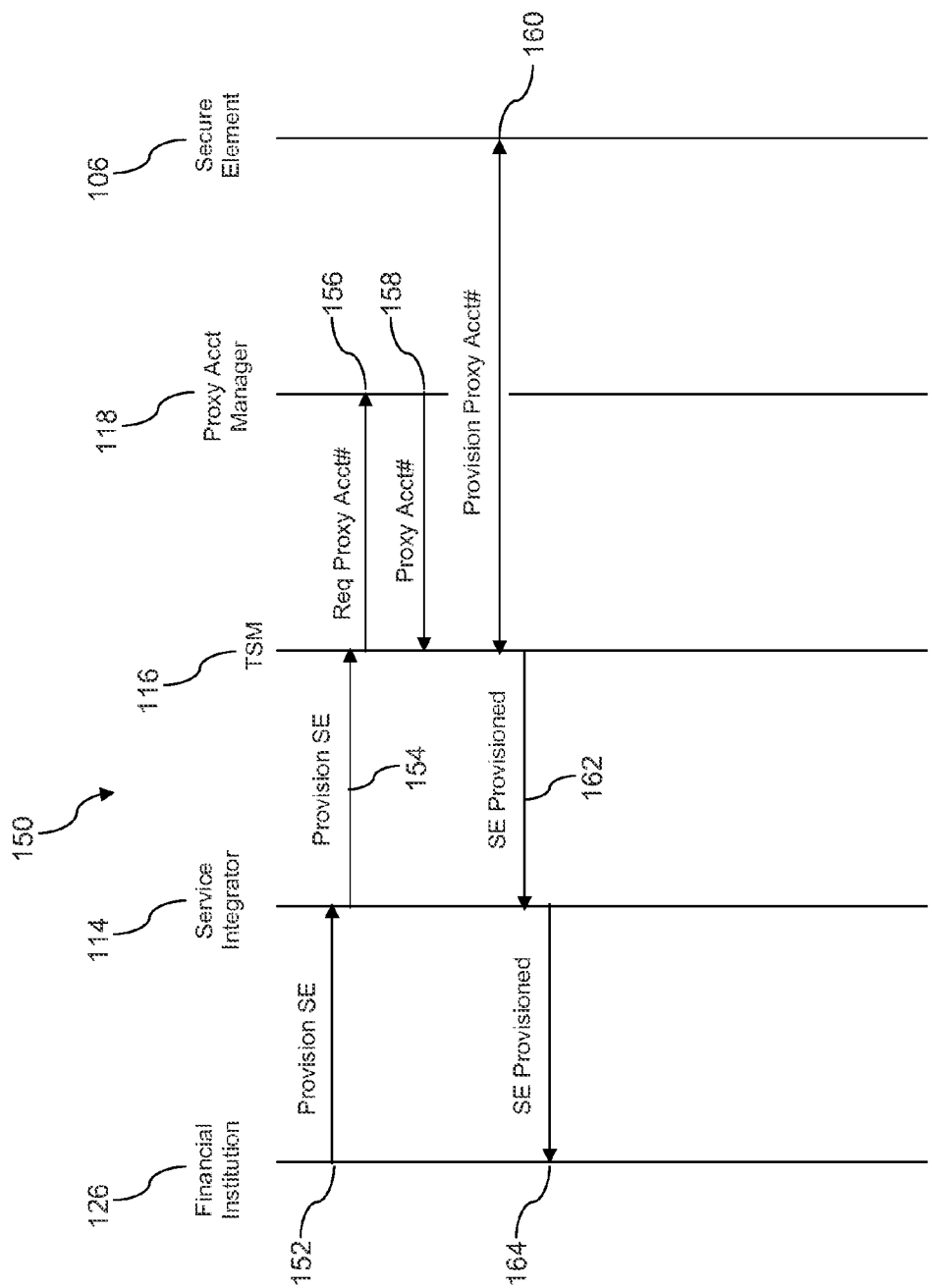
FIG. 4 illustrates a message sequence according to an embodiment of the disclosure.

Turning now to FIG. 4, a message sequence 150 is described. In an embodiment, the message sequence 150 may be used to provision a proxy account number 108 to a secure element 106. The financial institution 126 sends a provision secure element message 152 to the service integrator 114. The provision secure element message 152 may comprise a variety of information including an identification of the electronic device 102, the secure element 106, the payment account number, and possibly additional authentication and/or corroborative information. The optional additional information may comprise an authorization code, an expiration date, a personal identification number (PIN), and/or other information. In some contexts, the provision secure element message 152 may be referred to as a provisioning request message.

The service integrator 114 responds to receiving the provision secure element message 152 by sending provision secure element message 154 to the trusted service manager 116. The provision secure element message 154 may be a duplicate of the provision secure element message 152, or the provision secure element message 154 may reformat the provision secure element message 152 and/or add additional information to the provision secure element message 152.

In response to receiving the provision secure element message 154, the trusted service manager 116 may send a request proxy account message 156 to the proxy account manager 118. The proxy account manager 118 creates a proxy account number and returns this in a proxy account number message 158 to the trusted service manager 116. The proxy account manager 118 also creates a new entry in the proxy account number data store 120 that associates the proxy account number 108 with the payment account number and optional additional authentication and/or corroborative information. The trusted service manager 116 provisions the proxy account number 108 provided in the proxy account number message 158 into the secure element 106 during a provision proxy account number communication session 160. It is understood that the provision proxy account number communication session 160 may encapsulate a plurality of messages passing back and forth between the trusted service manager 116 and the secure element 106. After provisioning the proxy account number 108 into the secure element 106, the trusted service manager 116 sends a secure element provisioned confirmation message 162 to the service integrator 114, and the service integrator 114 transmits a copy or reformatted secure element provisioned confirmation message 164 to the financial institution 126.

When the secure element 106 is already provisioned with a proxy account number 108, the message sequence 150 may be modified by omitting the provision proxy account number communication session 160. The message sequence 150 may be followed when provisioning a payment account number to the secure element 106.

It will be appreciated that the expression "provisioning a payment account number to the secure element 106" is used informally and in an abstract sense here when referring to the activity depicted in FIG. 4. In fact, what is provisioned to the secure element 106 in the sequence of messages depicted and described with reference to FIG. 4 is a proxy account number 108. The secure element 106 may be informally described as provisioned with a payment account number in that the proxy account manager 118 can resolve the proxy payment number 108 to the subject payment account number under the appropriate conditions. Provisioning a payment account number can involve (1) provisioning a proxy account number 108 into the secure element 106 and (2) creating an association between the proxy account number 108 and the payment account number in the proxy account number data store 120.

Alternatively, if the proxy account number 108 is already provisioned into the secure element 106, provisioning a payment account number can involve (1) creating an association between the proxy account number 108 and the new payment account number in the proxy account number data store 120. A payment account number may be provisioned into the secure element 106, but such provisioning may proceed using known methods and without engaging the proxy account manager 118. Note that the provisioning process depicted in FIG. 4 is transparent to the point-of-sale terminal 122.

Figure 5:
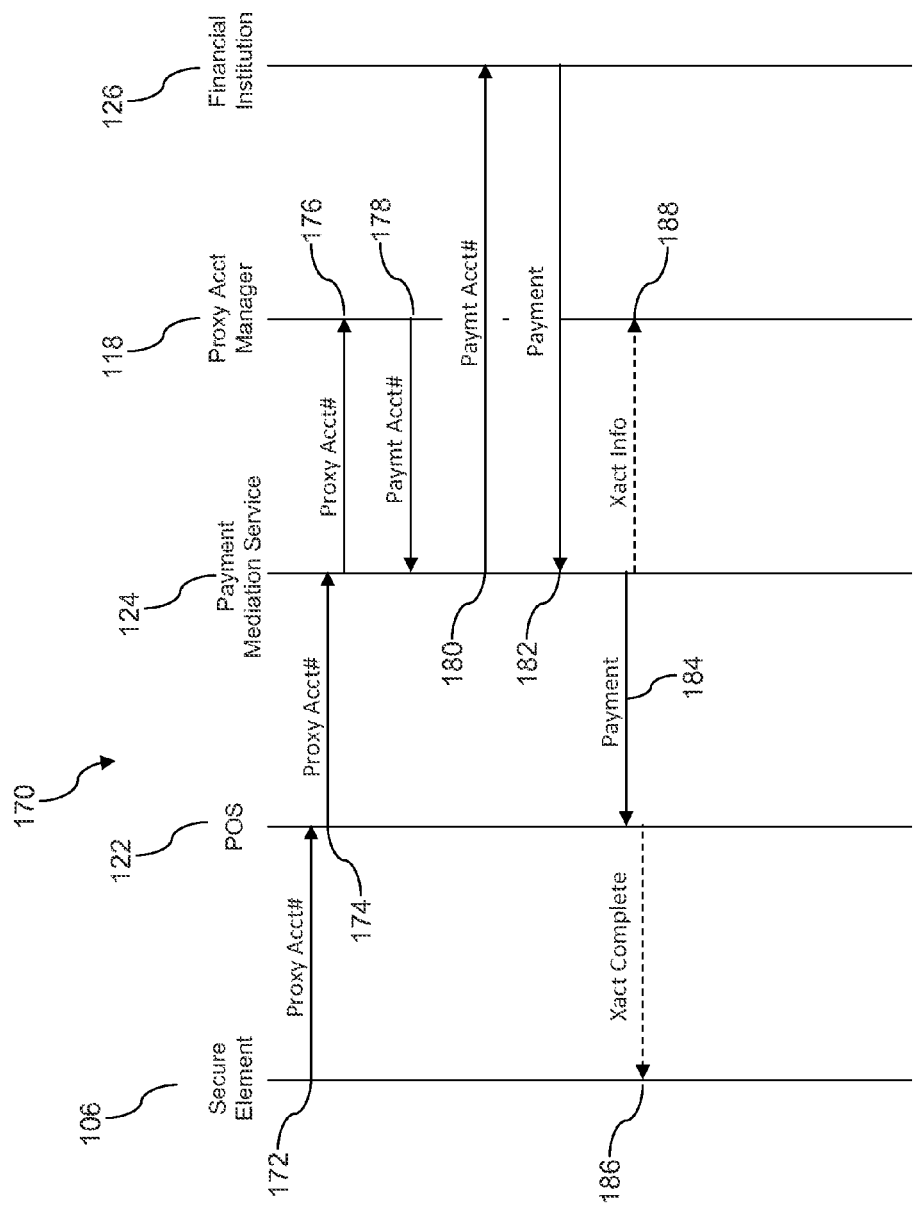
FIG. 5 illustrates another message sequence according to an embodiment of the disclosure.

Turning now to FIG. 5, a message sequence 170 is described. The message sequence 170 may be employed for completing a payment based on the proxy account number 108 stored in the secure element 106. The secure element 106 sends a proxy account number message 172 to a point-of-sale terminal 122 comprising the proxy account number 108, for example to complete payment for a product or service. The proxy account number message 172 may include additional information such as an identity of the electronic device 102 and/or the secure element 106. The point-of-sale terminal 122 sends a proxy account number message 174 to the payment mediation service 124 to obtain payment. The proxy account number message 174 may copy or reformat the proxy account number message 172 and optionally may add further information such as the identity of the point-of-sale terminal 122, the identity of the product or products being purchased, the amount of the purchase, and possibly other information.

The payment mediation service 124 may send a proxy account number message 176 to the proxy account manager 118. The proxy account number message 176 may be a copy of or reformat the proxy account number message 174. The proxy account manager 118 may retrieve a plurality of entries 130 that match the proxy account number 108 encapsulated in the proxy account number message 176. From the plurality of entries 130 that match the proxy account number 108, the proxy account manager 118 will select one entry 130 and return the payment account number encapsulated in the selected entry 130 in a payment account number message 178 to the payment mediation service 124. The payment account number message 178 may further encapsulate additional authentication information and/or corroboration information associated with the payment account number. The payment mediation service 124 sends a payment account number message 180 to the financial institution 126 that associates to the subject payment account number encapsulated in the payment account number message 176 received from the proxy account manager 118. The financial institution 126 returns a payment message 182 to the payment mediation service 124.

The payment mediation service 124 may transfer funds to an account associated with the point-of-sale terminal 122 or queue a payment transaction for later completion, for example for an end-of-day settlement. The payment mediation service 124 sends a payment completed message 184 to the point-of-sale terminal 122. The point-of-sale terminal 122 may send a transaction complete message 186 to the secure element 106. Alternatively, the point-of-sale terminal 122 may present a transaction completed message or aural tone that the user of the electronic device 102 can see or hear.

The proxy account manager 118 may select one entry 130 from a plurality of entries 130 each associated with the subject proxy account number 108 in a variety of ways. The electronic device 102 may send a message selecting a payment account number to the proxy account manager 118, for example via a cellular message to the base transceiver station 112, via the network 113, to the proxy account manager 118. The selected payment account number may be understood to remain selected until changed by the electronic device 102 in a later selection message.

Alternatively, the proxy account manager 118 may execute a rule engine that selects the entry 130 from the plurality of entries 130 that associate to the subject proxy account number 108 based on pre-defined rules and based on a context of the payment transaction. For example, the rules may indicate that when a branded credit card associates with the subject point-of-sale terminal 122, select the payment account number that associates to the branded credit card (it being understood that the branded credit card is also associated to the proxy account number 108). If the subject point-of-sale terminal 122 is not associated to a branded credit card that is also associated with the subject proxy account number 108, when the location of the point-of-sale terminal 122 is within a five mile radius of a home location, select a home range payment account number otherwise select a different payment account number. It is contemplated that yet other rules for selecting a payment account number from a plurality of payment account numbers that associate to the subject proxy account number may be defined.

In an embodiment, a default set of pre-defined rules may be established by the proxy account manager 118. These default rules may be applied to users who do not want to take the time to choose and configure their own rules or users who are intimidated by technology. In an embodiment, however, users may be able to alter and/or customize the pre-defined rules that the proxy account manager 118 applies to resolve the subject proxy account number 108 to a specific entry 130. The user may be able to identify associations between specific locations (specific point-of-sale terminals 122) and specific entries 130. In an embodiment, in the instance that the selected secure element 106 does not store a proxy account number 108 that matches the specific entry 130 associated with a specific location, an indication may be provided to the user of the electronic device 102 that the selected secure element 106 should be checked or the secure element 106 to be used for the present transaction should be confirmed and if desired changed. Alternatively, in an embodiment, the proxy account manager 118 may default to some other rule for selecting an entry 130 based on the subject proxy account number 108 when such a disjoint occurs. The user of the electronic device 102 may use an interface of the electronic device 102 to define these rules. Alternatively, the user of the electronic device 102 may use a web interface on any computer system to define the pre-defined rules. Alternatively, the user of the electronic device 102 may work with a customer care representative who enters the desired pre-defined rules into the proxy account manager 118 and/or the proxy account number data store 120 on behalf of the user of the electronic device 102.

After the payment mediation service 124 receives the payment message 182, the payment mediation service 124 may send a transaction information message 188 to the proxy account manager 118. The transaction information message 188 may indicate the amount of the payment that was made, the identity of the point-of-sale terminal 122, the product or service that was paid for, and other information about the transaction. The proxy account manager 118 may store this information in a transaction data store as an entry that identifies the proxy account number, the payment account number 108, the payment amount, the identity of the point-of-sale terminal 122, the product or service paid for, and other information. In an embodiment, the information stored in the entry in the transaction data store may be aggregated by the proxy account manager 118 based on information collected by the proxy account manager 118 from the proxy account number message 176 and from the transaction information message 188. For example, in an embodiment, a transaction identity may be associated with the total transaction represented in the message sequence 170, and the proxy account manager 118 may be able to associate and aggregate the information about the transaction using the transaction identity as a unifying handle.

The proxy account manager 118 may provide an interface for requesting reports on transactions. For example, a user of the electronic device 102 may request a record of all transactions associated with the first proxy account number 108a. This may include transaction records associated with three or more payment account numbers. Alternatively, the user of the electronic device 102 may request a record of all transactions associated with the first proxy account number 108a, the second proxy account number 108b, and the third proxy account number 108c ordered by date or instead ordered by proxy account number 108 and secondarily by date. The proxy account manager 118 may generate the report by performing searches in the transaction data store using the appropriate search handles.

Figure 6:
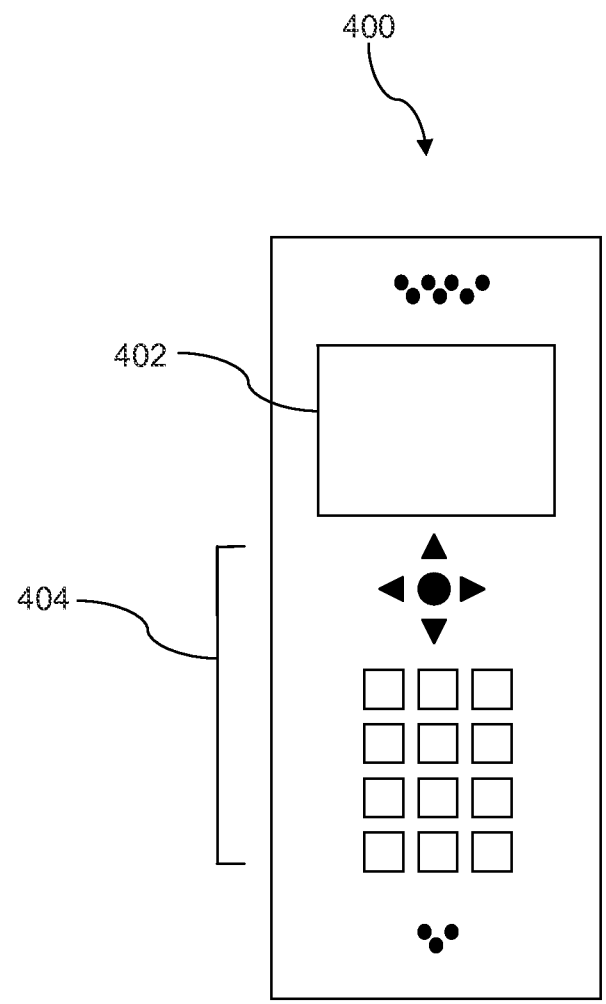
FIG. 6 illustrates an electronic device according to an embodiment of the disclosure.

FIG. 6 depicts the mobile device 400, which is operable for implementing aspects of the present disclosure, but the present disclosure should not be limited to these implementations. For example, in an embodiment, the electronic device 102 described above with reference to FIG. 1 may be implemented in a form substantially similar to the mobile device 400. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
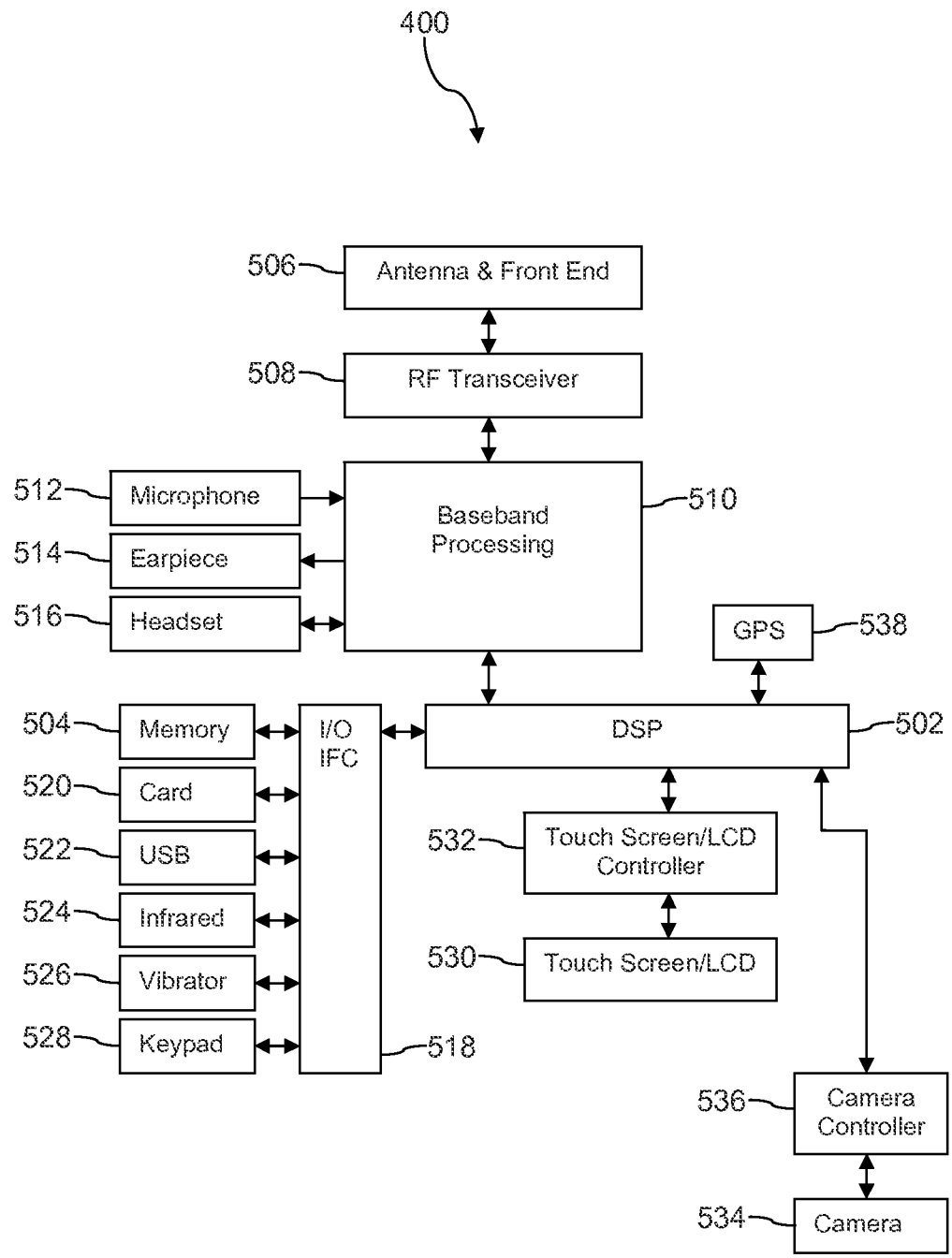
FIG. 7 is a block diagram of an electronic device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
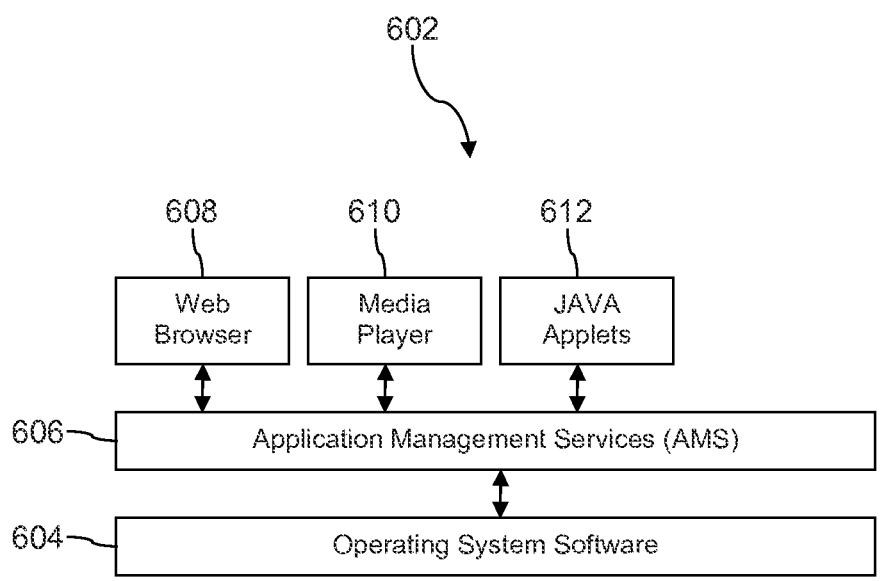
FIG. 8A is an illustration of a software architecture of an electronic device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 8B:
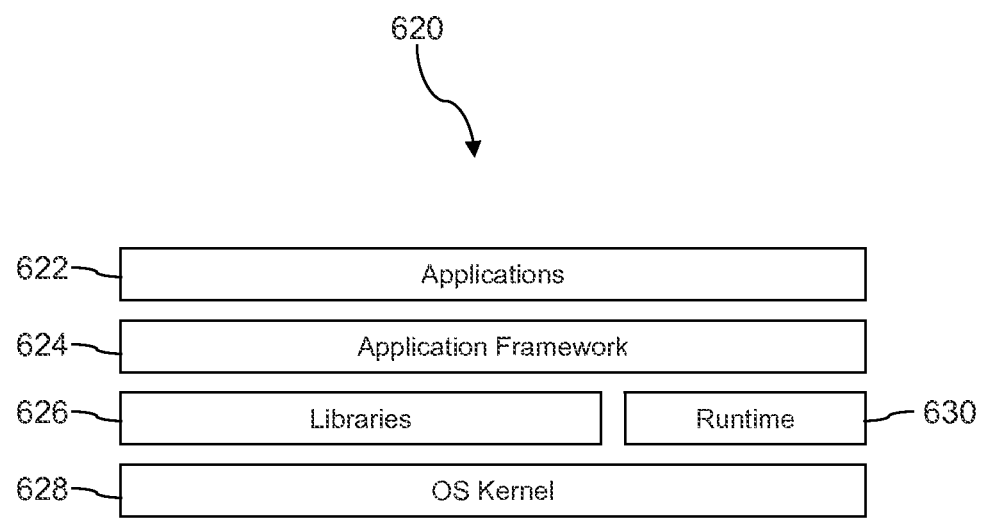
FIG. 8B is an illustration of another software architecture of an electronic device according to an embodiment of the disclosure.

FIG. 8B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
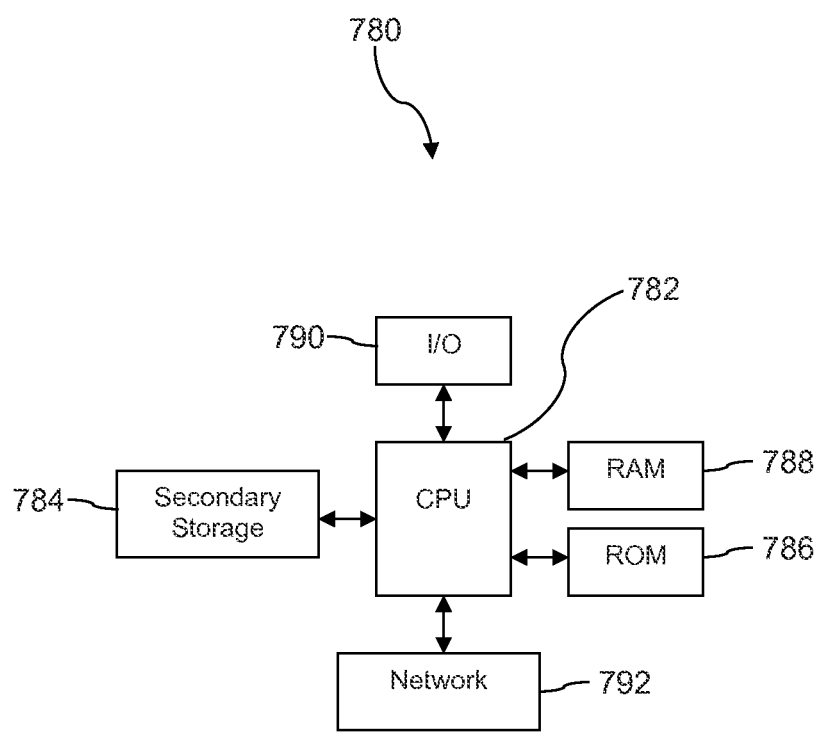
FIG. 9 is an illustration of a computer system according to an embodiment of the disclosure.

FIG. 9 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A near field communication payment method using a proxy account number, comprising:
    transmitting the proxy account number from a secure element of a mobile phone to a point-of-sale terminal using a near field communication radio link, wherein the proxy account number is associated with a plurality of payment account numbers;
    transmitting via a network, the proxy account number from the point-of-sale terminal to a payment mediation server;
    transmitting via the network, the proxy account number from the payment mediation server to a proxy account manager;
    determining, by the proxy account manager, a selected payment account number based in part on retrieving the plurality of payment account numbers from a proxy account number data store using the proxy account number and based on at least one of a message from the mobile phone specifying the selected payment account number and one or more rules of a plurality of predefined rules;
    transmitting via the network, by the proxy account manager, the selected payment account number to the payment mediation server;
    requesting, by the payment mediation server, an approval and subsequently receiving the approval of the payment transaction from a financial institution associated with the selected payment account number; and
    completing, by the payment mediation server, a payment transaction with the point-of-sale terminal using the selected payment account number in response to receiving the approval.

2. The method of claim 1, wherein the plurality of payment account numbers comprise a credit card number or a debit card number.

3. The method of claim 1, further comprising receiving, by the proxy account manager from the mobile phone, a message designating the selected payment account number as a preferred payment vehicle, wherein the proxy payment account number manager determines the selected payment account number based on the preferred payment vehicle designation.

4. The method of claim 1, wherein the proxy account manager determines the selected payment account number based on information about the purchase transaction provided to the proxy account manager along with the proxy account number.

5. The method of claim 4, wherein the proxy account manager determines the selected payment account number by analyzing the information about the purchase transaction using rules transmitted to the proxy account manager by the mobile phone.

6. The method of claim 1, wherein each rule of the plurality of predefined rules is one of a default rule and a user-defined rule, and wherein the user-defined rule is set using an interface of the electronic device, a web interface, or a customer care representative.

7. The method of claim 1, further comprising provisioning the proxy account number, wherein provisioning the proxy account number comprises:
    receiving, by the proxy account manager, a first message requesting provisioning of the proxy account number, the first provisioning request message identifying a first payment account number of the plurality of payment account numbers;
    in response to the first provisioning request message identifying the first payment account number, generating, by the proxy account manager, the proxy account number;
    creating, by the proxy account manager, an association of the proxy account number with the secure element in the proxy account number data store; and
    creating, by the proxy account manager, an association of the first payment account number with the proxy account number in the proxy account number data store.

8. The method of claim 7, further comprising:
    receiving, by the proxy account manager, a second message requesting to provision a second payment account number of the plurality of payment account numbers to the secure element of the mobile device, the second provisioning request message identifying the second payment account number;
    creating, by the proxy account manager, an association of the second payment account number with the proxy account number in the proxy account number data store.

9. The method of claim 8, further comprising:
receiving, by the proxy account manager, a third message requesting provisioning of a second proxy account number for a second secure element of the portable electronic device, the third provisioning request message identifying a third payment account number;
generating, by the proxy account manager, the second proxy account number in response to the third provisioning request message identifying the third payment account number;
creating, by the proxy account manager, an association of the second proxy account number with the second secure element in the proxy account number data store; and
creating, by the proxy account manager, an association of the third payment account number with the second proxy account number in the proxy account number data store.

10. The method of claim 9, further comprising:
transmitting, by the proxy account manager, the proxy account number to a trusted service manager that installs the proxy account number on the secure element of the mobile phone; and
transmitting, by the proxy account manager, the second proxy account number to the trusted service manager that installs the second proxy account number on the second secure element of the mobile phone.

11. The method of claim 10, further comprising transmitting the proxy account number to a service integrator server; and transmitting the second proxy account number to the service integrator server.

12. The method of claim 1, further comprising:
creating a record comprising information about the payment transaction, wherein the record identifies both the proxy account number and the selected payment account number;
storing the record in a transaction data store;
accessing a plurality of records associated with a plurality of different payment account numbers stored in the transaction data store based on the proxy account number, wherein each of the plurality of records is associated with the proxy account number; and
generating an aggregated report of electronic payment transactions associated with the proxy account number based on accessing the plurality of records.

13. The method of claim 12, further comprising receiving a message indicating completion of the payment transaction based on a reply message containing the selected payment account number, wherein the payment transaction completion message indicates a payment amount and a receiver of the payment amount, and wherein the information about the payment transaction in the record further comprises the payment amount and the receiver of the payment amount.

* * * * *